United States Patent
Hatta (10) Patent No.: US 10,926,433 B2
(45) Date of Patent: Feb. 23, 2021

(54) METHOD FOR MANUFACTURING HIGH-PRESSURE TANK

(71) Applicant: TOYOTA JIDOSHA KABUSHIKI KAISHA, Toyota (JP)

(72) Inventor: Ken Hatta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/668,036

(22) Filed: Oct. 30, 2019

(65) Prior Publication Data

US 2020/0198189 A1 Jun. 25, 2020

(30) Foreign Application Priority Data

Dec. 19, 2018 (JP) .............................. JP2018-237082

(51) Int. Cl.
| | | |
|---|---|---|
| *B29C 35/02* | (2006.01) | |
| *B29C 70/30* | (2006.01) | |
| *D06M 11/74* | (2006.01) | |
| *B60K 15/04* | (2006.01) | |
| *B60K 15/03* | (2006.01) | |

(52) U.S. Cl.
CPC .......... *B29C 35/0288* (2013.01); *B29C 70/30* (2013.01); *D06M 11/74* (2013.01); *B60K 2015/03046* (2013.01); *B60K 2015/047* (2013.01); *F17C 2203/0621* (2013.01)

(58) Field of Classification Search
CPC ....... B29C 35/0288; B29C 70/30; F17C 1/06; F17C 1/16
See application file for complete search history.

(56) References Cited

U.S. PATENT DOCUMENTS

| | | | | |
|---|---|---|---|---|
| 2004/0251007 A1* | 12/2004 | Toh | ........................... | F17C 1/00 |
| | | | | 165/157 |
| 2010/0025412 A1* | 2/2010 | Wakao | ..................... | B29C 70/32 |
| | | | | 220/590 |

(Continued)

FOREIGN PATENT DOCUMENTS

| | | |
|---|---|---|
| JP | 2008-261414 A | 10/2008 |
| JP | 2013-193393 A | 9/2013 |
| JP | 2014-081014 A | 5/2014 |

*Primary Examiner* — Joseph S Del Sole
*Assistant Examiner* — Mohamed K Ahmed Ali
(74) *Attorney, Agent, or Firm* — Dickinson Wright PLLC (57) ABSTRACT

A method for manufacturing a high-pressure tank, capable of removing bubbles inside a carbon-fiber layer and those on an outer surface thereof without deteriorating a strength of the carbon-fiber layer, preventing a defective appearance, reducing variations in size, and thereby manufacturing a high-pressure tank having an excellent strength is provided. A method for manufacturing a high-pressure tank includes an uncured carbon-fiber layer forming step of forming an uncured carbon-fiber layer around a liner, a glass-fiber layer forming step of forming an uncured glass-fiber layer around the uncured carbon-fiber layer, a pin inserting step of inserting a tubular pin disposed therein from an uncured glass-fiber layer side to an interface of the uncured carbon-fiber layer, a gas sucking step of sucking a gas from the pin, and a thermally-curing treatment step of forming a glass-fiber layer and a carbon-fiber layer.

4 Claims, 9 Drawing Sheets

(56) References Cited

U.S. PATENT DOCUMENTS

2013/0092311 A1* 4/2013 Kobayashi ............ B29C 70/326
  156/64
2014/0103051 A1 4/2014 Kanezaki et al.
2018/0266627 A1* 9/2018 Ogiwara ................ F17C 13/06

* cited by examiner

METHOD FOR MANUFACTURING HIGH-PRESSURE TANK

CROSS REFERENCE TO RELATED APPLICATIONS

This application is based upon and claims the benefit of priority from Japanese patent application No. 2018-237082, filed on Dec. 19, 2018, the disclosure of which is incorporated herein in its entirety by reference.

BACKGROUND

The present disclosure relates to a method for manufacturing a high-pressure tank.

As a configuration of a container for a high-pressure tank, one that includes a carbon-fiber layer disposed on an outer surface of a liner that serves as a container is known.

As one of know methods for manufacturing such a high-pressure tank, there is a method in which a carbon-fiber layer is formed by winding carbon fibers impregnated with a thermosetting resin around a liner by a filament winding method (an FW method) and then curing the thermosetting resin contained in the carbon fiber. Japanese Unexamined Patent Application Publication No. 2013-193393 discloses that in the above-described method for manufacturing a high-pressure tank, bubbles formed in the surface layer of the high-pressure tank are removed by applying an antifoaming solution to the outer surface of the carbon-fiber layer.

As other examples, Japanese Unexamined Patent Application Publications No. 2008-261414 and No. 2014-81014 disclose that an opening extending to the liner layer is formed in the carbon-fiber layer in order to prevent a high-pressure gas that has passed through the liner from accumulating between the liner and the carbon-fiber layer. In this technique, the opening is provided by forming a hole in the carbon-fiber layer. Therefore, there is a problem that the strength of the carbon-fiber layer deteriorates.

SUMMARY

In the aforementioned method for manufacturing a high-pressure tank by using the FW method, there are cases in which air remains in the stacked carbon fibers (i.e., among the stacked carbon fibers) when the carbon fibers are wound. Further, there are cases in which gases are generated during the curing reaction of the thermosetting resin in the process for heating the thermosetting resin. These gases move to the outside in the heating process, thus causing a problem that projections and depressions (hereinafter also referred to as unevenness) are formed on the surface layer of the carbon-fiber layer due to bubbles. This unevenness causes a defective appearance and variations in size. Further, bubbles that remain inside the carbon-fiber layer deteriorate the strength of the carbon-fiber layer. Further, there is a possibility that these bubbles cause cracking when the tank receives an impact.

In the aforementioned technique disclosed in Japanese Unexamined Patent Application Publication No. 2013-193393, although bubbles in the surface layer are removed to some extent, bubbles inside the carbon-fiber layer are not removed. Further, in the technique disclosed in Japanese Unexamined Patent Application Publication No. 2013-193393, there is a problem that a part of the antifoaming agent that does not contribute to the strength of the carbon-fiber layer remains in the carbon-fiber layer.

The present disclosure has been made in view of the above-described circumstances and provides a method for manufacturing a high-pressure tank, capable of removing bubbles inside a carbon-fiber layer and those on an outer surface thereof without deteriorating a strength of the carbon-fiber layer, preventing a defective appearance, reducing variations in size, and thereby manufacturing a high-pressure tank having an excellent strength.

A first exemplary aspect is a method for manufacturing a high-pressure tank includes:

an uncured carbon-fiber layer forming step of forming an uncured carbon-fiber layer by winding carbon fibers impregnated with a thermosetting resin around a liner;

a glass-fiber layer forming step of forming an uncured glass-fiber layer by winding glass fibers impregnated with a thermosetting resin around the uncured carbon-fiber layer;

a pin inserting step of inserting a tubular pin with a porous metal disposed therein from an uncured glass-fiber layer side to an interface of the uncured carbon-fiber layer;

a gas sucking step of sucking a gas from the pin; and a thermally-curing treatment step of forming a glass-fiber layer and a carbon-fiber layer by performing a thermally-curing treatment after pulling out the pin.

In the above-described manufacturing method according to an aspect of the present disclosure, it is possible to remove bubbles on the surface of the carbon-fiber layer and those inside thereof by sucking the gas by using the pin. Further, since the hole remains in the glass-fiber layer even after the pin is pulled out, the gas is discharged through this hole even during the thermally-curing treatment. Further, since the pin is inserted only through the glass-fiber layer, the carbon fibers are not damaged and the strength of the carbon-fiber layer is not impaired.

The above-described method for manufacturing a high-pressure tank may further include a gas discharging step of discharging the gas from the pin after the pin is pulled out.

According to this gas discharging step, it is possible to remove the thermosetting resin deposited on a surface of the pin and thereby to successively manufacture the next high-pressure tank by using the pin.

In the above-described method for manufacturing a high-pressure tank, diameters of pores of the porous metal are preferably 500 μm or smaller, so that the thermosetting resin is less likely to enter the inside of the pin.

Further, in the above-described method for manufacturing a high-pressure tank, in the gas sucking step, a temperature of the uncured carbon-fiber layer is preferably adjusted to a temperature that is higher than a glass transition temperature of the thermosetting resin and is lower than a curing start temperature thereof.

By controlling the temperature as described above, the thermosetting resin is brought into a low-viscous state, thus enabling the bubbles to move to the surface more easily and enabling the gas to be sucked more easily.

According to the present disclosure, it is possible to provide a method for manufacturing a high-pressure tank, capable of removing bubbles inside a carbon-fiber layer and those on an outer surface thereof without deteriorating a strength of the carbon-fiber layer, preventing a defective appearance, reducing variations in size, and thereby manufacturing a high-pressure tank having an excellent strength.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure will be described hereinafter with reference to the drawings. However, the present disclosure is not limited to the below-shown embodiments. Further, the following descriptions and drawings are simplified as appropriate for clarifying the explanation. Further, for the sake of explanation, the scale of each component in the drawings may widely differ from that of an actual component.

First Embodiment

Figure 1:
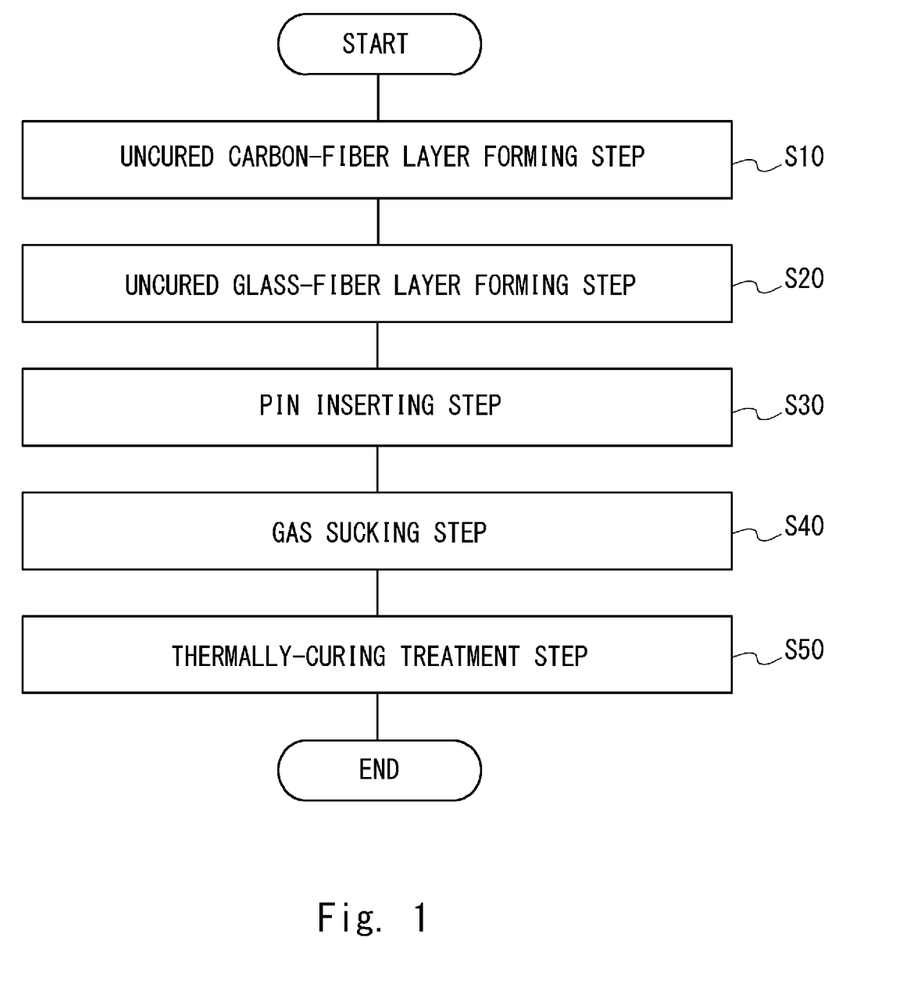
FIG. 1 is flowchart showing a method for manufacturing a high-pressure tank according to a first embodiment.

An outline of a method for manufacturing a high-pressure tank according to a first embodiment is described with reference to FIG. 1. FIG. 1 is a flowchart showing the method for manufacturing a high-pressure tank according to the first embodiment. In the method for manufacturing a high-pressure tank according to the first embodiment, an uncured carbon-fiber layer forming step (S10), an uncured glass-fiber layer forming step (S20), a pin inserting step (S30), a gas sucking step (S40), and a thermally-curing treatment step (S50) are performed in this order. Further, other steps may be performed as required.

Prior to performing the method for manufacturing a high-pressure tank according to the first embodiment, first of all, a liner is prepared. The liner constitutes a basic external form of a container 10 of a high-pressure tank (see FIG. 4). As the liner, for example, a container made of a resin having a gas barrier property is used. In this embodiment, a well-known liner can be used and, for example, a commercially available liner may be used. Alternatively, a liner having a desired shape may be manufactured. The liner can be manufactured by molding it from a resin having a gas barrier property by using a known method such as injection molding. As the resin having a gas barrier property, a high-density polyethylene, polyimide, or the like may be used. The liner in this embodiment may be equipped with a cap 61 or the like.

In the uncured carbon-fiber layer forming step (S10), an uncured carbon-fiber layer is formed by winding carbon fibers impregnated with a thermosetting resin around the liner. A known thermosetting resin may be used as the thermosetting resin. For example, an epoxy resin may be used. Further, a curing agent is usually added in the resin. The carbon fibers are wound around the liner by a FW (Filament Winding) method. In order to ensure the strength of the high-pressure tank, the carbon fibers are usually wound around the same area of the liner a plurality of times. Therefore, a plurality of carbon fibers are stacked on top of each other before and after the curing (see FIG. 5).

In the uncured glass-fiber layer forming step (S20), an uncured glass-fiber layer is formed by winding glass fibers impregnated with a thermosetting resin around the uncured carbon-fiber layer. As the thermosetting resin, the same resin as that used in the carbon-fiber layer can be used. The method for winding glass fibers is not limited to any particular method. For example, they are wound by the FW method. Alternatively, cloth-like glass fibers that are woven from glass fibers may be wound around the uncured carbon-fiber layer.

Figure 6A:
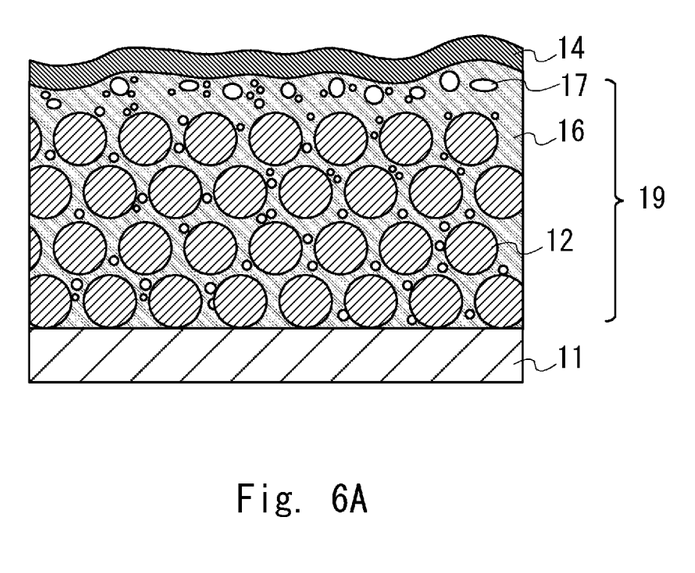
FIG. 6A is a cross section schematically showing an example of the part A after an uncured glass-fiber layer forming step.

FIG. 6A is a cross section schematically showing an example of a layered structure of a stack of a liner 11, an uncured carbon-fiber layer 19, and an uncured glass-fiber layer 14 (hereinafter also simply referred to as a stack) after the uncured glass-fiber layer forming step (S20) is performed. As shown in FIG. 6A, after the uncured glass-fiber layer forming step, the stack contains bubbles 17 in the stacked carbon fibers (i.e., among the stacked carbon fibers) and between the uncured carbon-fiber layer 19 and the uncured glass-fiber layer 14.

Figure 2:
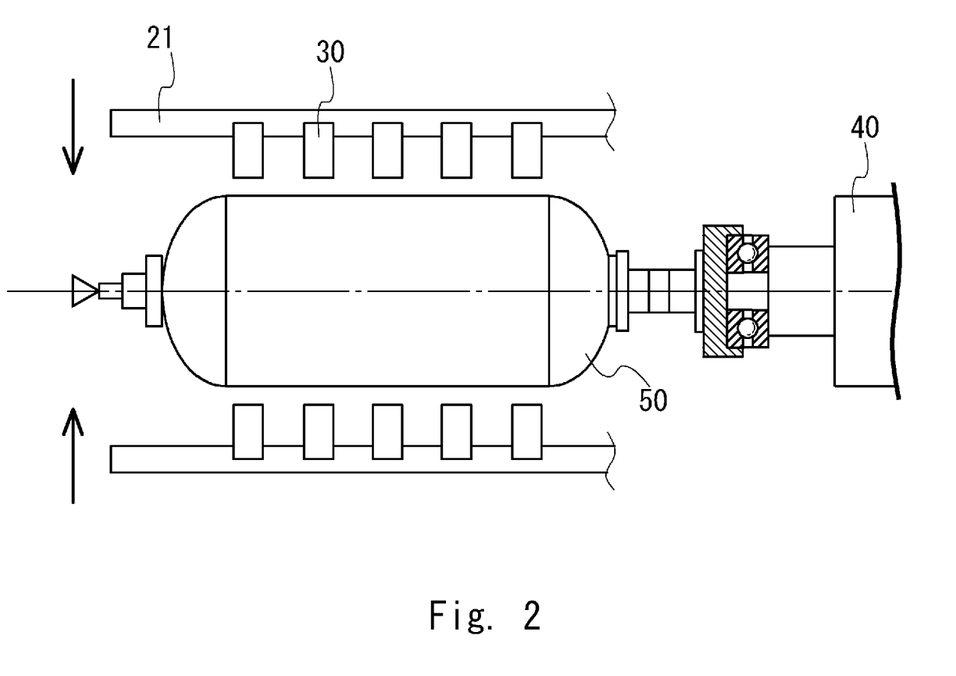
FIG. 2 is a schematic diagram showing an example of a configuration of an apparatus used in the method for manufacturing a high-pressure tank according to the first embodiment.
Figure 3:
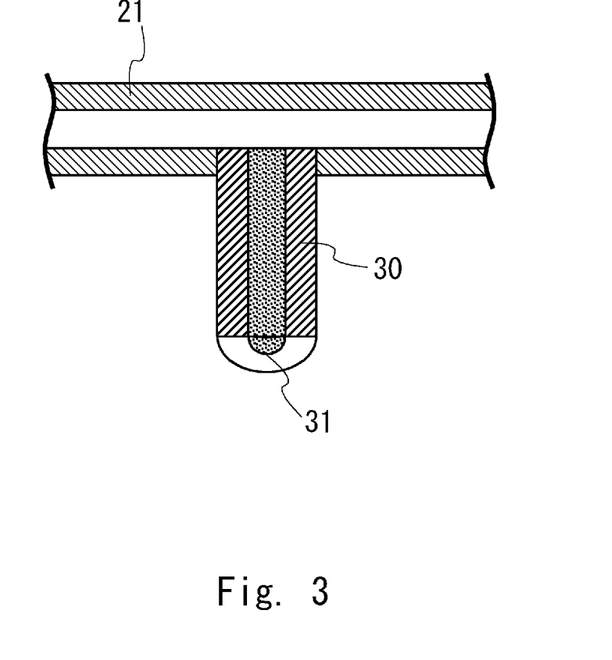
FIG. 3 is a cross section schematically showing an example of a pin.

FIG. 2 is a schematic diagram showing an example of a configuration of an apparatus used in the method for manufacturing a high-pressure tank according to the first embodiment. In the example shown in FIG. 2, a tank 50, in which a glass-fiber layer has already been formed, is fixed by a holder 40. Further, pipes 21 each of which includes a plurality of pins 30 are arranged around the tank 50, in which the glass-fiber layer has already been formed. The pipes 21 are connected to a pump (not shown) capable of supplying and discharging air and the pins 30 are disposed on the uncured glass-fiber layer side of the tank 50. The holder 40 may be equipped with a rotating mechanism for rotating the tank 50. Further, in this case, the pipes 21 may be equipped with a rotating mechanism for rotating them so as to follow the rotation of the holder 40. The apparatus shown in FIG. 2 may also be equipped with a heater (not shown). Further, the apparatus shown in FIG. 2 may be disposed in a space that can be heated such as inside a furnace. Further, FIG. 3 is a cross section schematically showing an example of the pin 30. In the apparatus shown in FIG. 2, each pin 30 is a tubular pin with a porous metal 31 disposed therein. Further, each pin 30 is capable of supplying and discharging air through the porous metal 31.

Figure 6B:
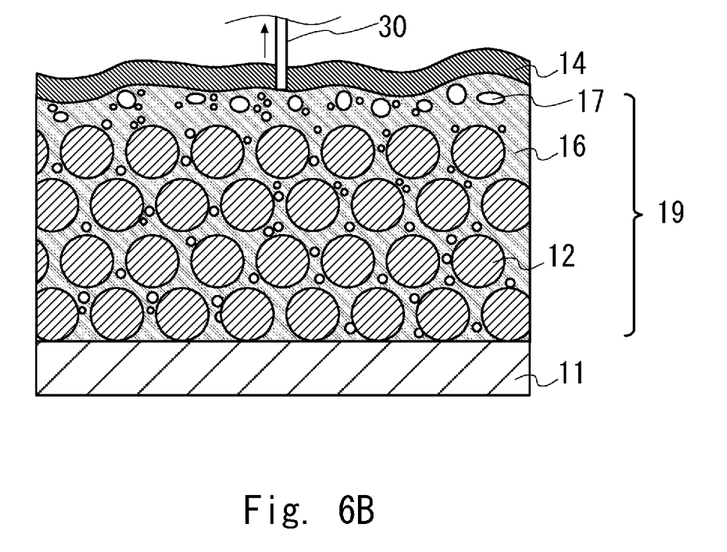
FIG. 6B is a cross section schematically showing an example of the part A during a gas sucking step.

In the pin inserting step (S30), the pin 30 is inserted from the uncured glass-fiber layer 14 side of the stack to an interface of the uncured carbon-fiber layer 19 thereof (i.e., an interface between the uncured glass-fiber layer 14 and the uncured carbon-fiber layer 19) as shown in FIG. 6B. A plurality of pins 30 may be inserted depending on the size and the like of the tank 50. In the example shown in FIG. 2, it is possible to simultaneously insert a plurality of pins 30 by moving the pipe(s) 21 toward the tank 50.

In the gas sucking step (S40), the bubbles 17 are removed by sucking the gas from the uncured carbon-fiber layer 19. In the first embodiment, since the pin 30 is the tubular pin with the porous metal disposed therein, only the gas can be sucked without sucking the thermosetting resin. In order to prevent the thermosetting resin from being sucked more reliably, the diameter of pores of the porous metal is preferably 500 μm or smaller. Further, the outer diameter of the pin 30 can be, for example, 5 to 10 mm, though it is not limited to this example. By adjusting the outer diameter of the pin 30 to 5 mm or larger, the pin has an excellent gas sucking property. Further, the pin also exhibits an excellent gas discharging property during the thermally-curing treatment (which will be described later).

The uncured thermosetting resin has fluidity. Therefore, by performing vacuum deaeration through the pin 30, the gas contained inside the uncured carbon-fiber layer 19 as well as the gas present in or near the surface layer rise and hence can be removed.

Because of the above-described features, in the gas sucking step, the temperature of the uncured carbon-fiber layer 19 is preferably adjusted to a temperature that is higher than the glass transition temperature of the thermosetting resin and is lower than the curing start temperature thereof. By adjusting the temperature in this way, the thermosetting resin can be brought into a low-viscous state. As a result, the gas contained inside the uncured carbon-fiber layer 19 easily rises, thus expediting the removal of the gas through the pin 30.

In the thermally-curing treatment step (S50), the pin(s) 30 is pulled out from the uncured glass-fiber layer 14. Then, a carbon-fiber layer 18 and a glass-fiber layer 20 are formed by performing a thermally-curing treatment (see FIGS. 6C and 5).

Figure 7:
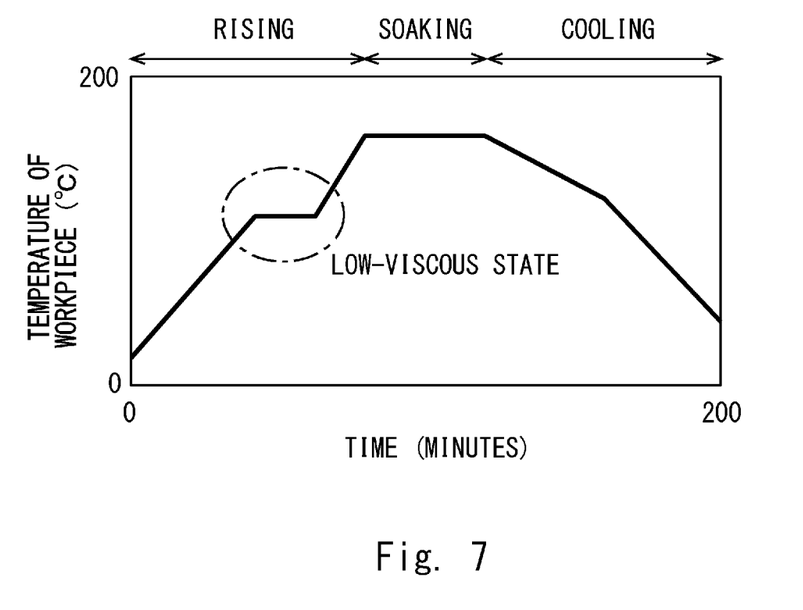
FIG. 7 is a graph showing a profile of temperatures of a workpiece in the method for manufacturing a high-pressure tank according to the first embodiment.

A profile of temperatures of a workpiece in the method for manufacturing a high-pressure tank according to the first embodiment is described with reference to FIG. 7. Note that the profile of temperatures of a workpiece shown in FIG. 7 is a temperature profile of the tank 50 shown in FIG. 2. The temperatures of the thermosetting resin contained in the carbon-fiber layer and the glass-fiber layer also exhibit similar temperature profiles.

The tank 50, in which the glass-fiber layer has already been formed, is fixed by the holder 40 shown in FIG. 2. Further, the pins are inserted and the sucking of the gas is started. After the sucking is started, the workpiece is preferably heated so that the thermosetting resin is maintained at a temperature at which it is brought into a low-viscous state. By maintaining the temperature at which the thermosetting resin is brought into the low-viscous state, the sucking of the gas contained in the carbon-fiber layer is expedited. After the gas is sufficiently sucked, the thermosetting resin is heated to a temperature at which it is cured. The pin(s) 30 is preferably pulled out when the surface layer of the glass-fiber layer starts to be cured. As shown in the example shown in FIG. 6C, after the pin 30 is pulled out, a hole 15 is formed in the glass-fiber layer. Since this hole serves as a discharging port for the gas contained in the carbon-fiber layer 13, it is possible to continue deaeration even after the curing of the carbon-fiber layer has started. A high-pressure tank is obtained by performing the heat treatment until the thermosetting resin is sufficiently cured.

After the pin 30 is pulled out and separated from the tank 50, gas discharging is preferably performed for the pin 30. By performing the gas discharging, it is possible to remove the thermosetting resin deposited on the surface of the pin 30. Therefore, it is possible to use the pin, without requiring any additional process, in the manufacturing process for another tank, thus making it possible to continuously manufacture high-pressure tanks.

Figure 4:
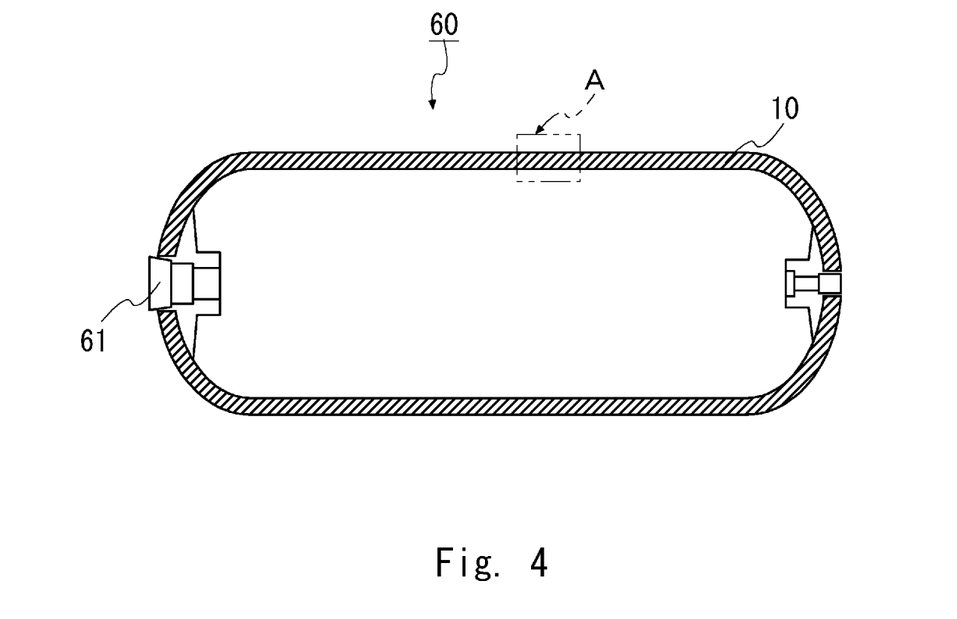
FIG. 4 is a cross section schematically showing an example of a high-pressure tank.
Figure 5:
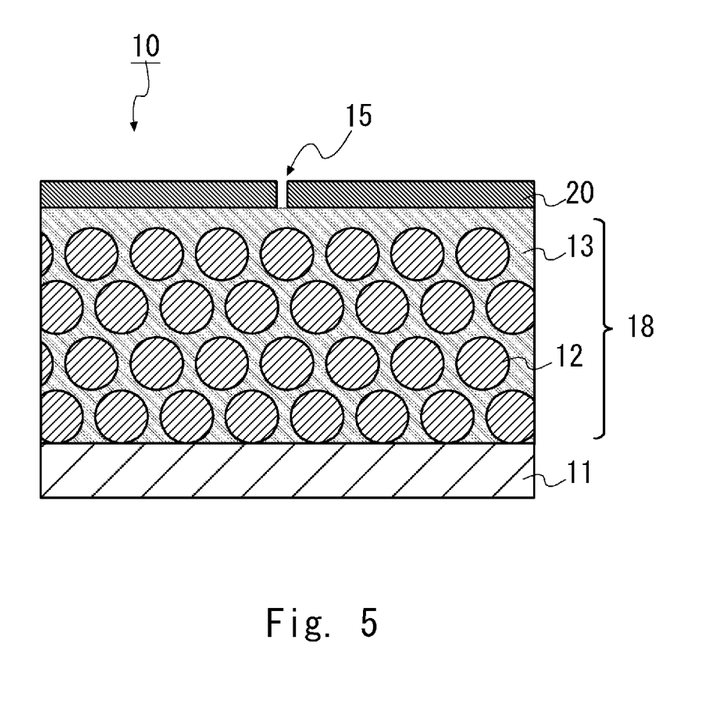
FIG. 5 is a cross section schematically showing an example of a layered structure of a part A shown in FIG. 4.
Figure 6C:
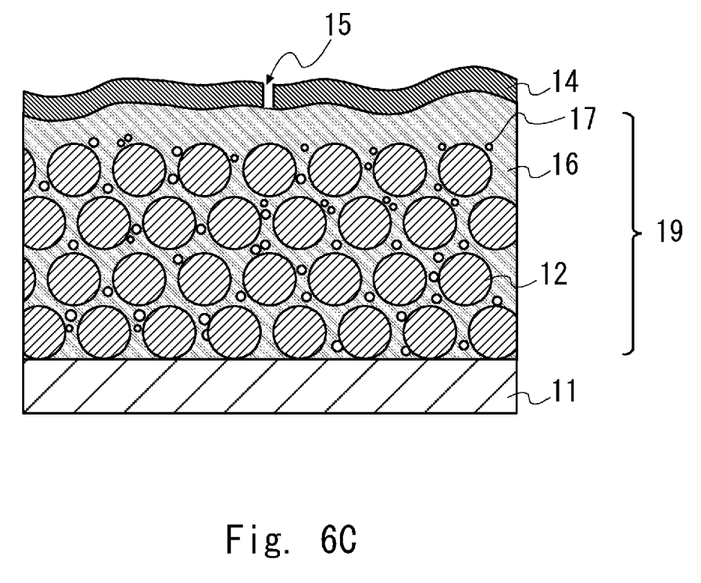
FIG. 6C is a cross section schematically showing an example of the part A during a thermally-curing treatment step.

A high-pressure tank obtained by the method for manufacturing a high-pressure tank according to the first embodiment is described with reference to FIGS. 4 and 5. The high-pressure tank obtained according to the first embodiment includes a container 10 having an arbitrary shape. Further, on the cross section of the container 10, it has a layered structure in which a liner 11, a carbon-fiber layer 18 containing carbon fibers 12 and a cured thermosetting resin, and a glass-fiber layer are stacked on top of each other in this order. The liner 11 is a layer for reinforcing the carbon-fiber layer. In the carbon-fiber layer formed according to this embodiment, the amount of remaining bubbles is small and there is no hole. Therefore, variations in size are small and the carbon-fiber layer has an excellent strength. The glass-fiber layer is a layer for protecting the carbon-fiber layer. Even though the hole 15 is formed in the glass-fiber layer, it does not impair the protection of the carbon-fiber layer. That is, the carbon-fiber layer is sufficiently protected. Therefore, in the high-pressure tank obtained according this embodiment, a defective appearance is prevented and variations in size are small as described above. Further the high-pressure tank has an excellent strength.

Since variations in size among high-pressure tanks obtained according to this embodiment are small and they have an excellent strength, they can be used for all kinds of known purposes. Among them, they are especially suitable for usage in vehicle-mounted fuel cells for which accurate sizes and high strengths are essential.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing a high-pressure tank comprising:
    an uncured carbon-fiber layer forming step of forming an uncured carbon-fiber layer by winding carbon fibers impregnated with a thermosetting resin around a liner;
    a glass-fiber layer forming step of forming an uncured glass-fiber layer by winding glass fibers impregnated with a thermosetting resin around the uncured carbon-fiber layer;
    a pin inserting step of inserting a tubular pin with a porous metal disposed therein from an uncured glass-fiber layer side to an interface of the uncured carbon-fiber layer;
    a gas sucking step of sucking a gas from the pin; and
    a thermally-curing treatment step of forming a glass-fiber layer and a carbon-fiber layer by performing a thermally-curing treatment after pulling out the pin.

2. The method for manufacturing a high-pressure tank according to claim 1, further comprising a gas discharging step of discharging the gas from the pin after the pin is pulled out.

3. The method for manufacturing a high-pressure tank according to claim 1, wherein diameters of pores of the porous metal are 500 μm or smaller.

4. The method for manufacturing a high-pressure tank according to claim 1, wherein in the gas sucking step, a temperature of the uncured carbon-fiber layer is adjusted to a temperature that is higher than a glass transition temperature of the thermosetting resin and is lower than a curing start temperature thereof.

* * * * *